UNITED STATES PATENT OFFICE.

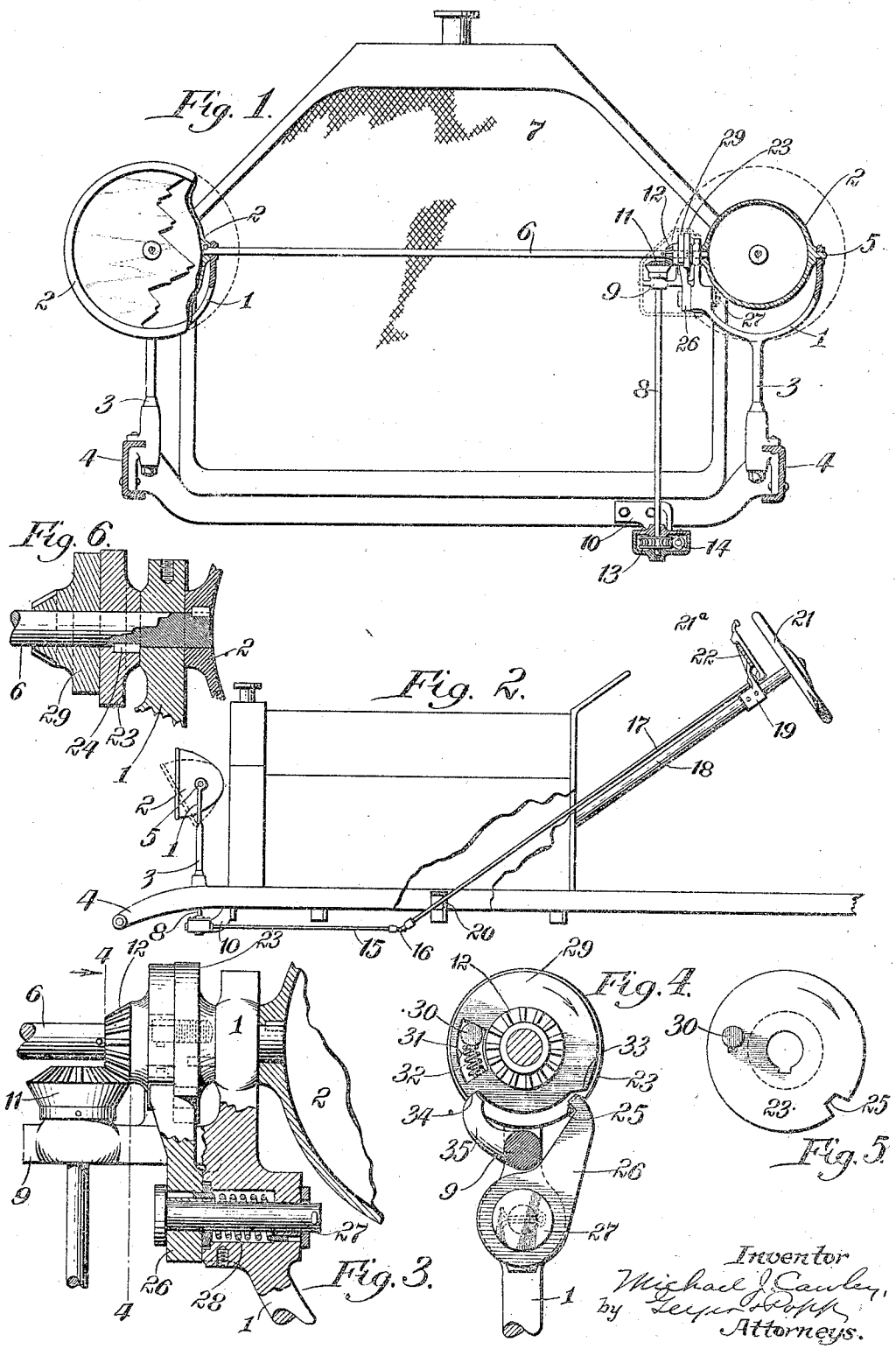

MICHAEL J. CAWLEY, OF BUFFALO, NEW YORK.

AUTOMOBILE-HEADLIGHT.

1,168,058.  Specification of Letters Patent. Patented Jan. 11, 1916.

Application filed October 22, 1915. Serial No. 57,228.

*To all whom it may concern:*

Be it known that I, MICHAEL J. CAWLEY, a citizen of the United States, residing at Buffalo, in the county of Erie and State of New York, have invented new and useful Improvements in Automobile-Headlights, of which the following is a specification.

Many automobile collisions and accidents to pedestrians are due to the blinding glare of the powerful headlights commonly used on such cars.

One of the objects of my invention is the provision of simple, convenient and inexpensive means by which the headlights may be tilted downwardly to direct their rays upon the road directly in front of the car, instead of into the eyes of the driver of an approaching car.

A further object is to provide means for locking the headlights in their normal or horizontal position, so as to prevent vertical vibration thereof and relieve their operating or controlling mechanism from undue strains.

In the accompanying drawings: Figure 1 is a front elevation, partly in section, of the headlights, their controlling means and adjacent parts of an automobile. Fig. 2 is a sectional side elevation thereof. Fig. 3 is an enlarged sectional elevation of the controlling and locking means. Fig. 4 is a transverse section on line 4—4, Fig. 3. Fig. 5 is a detached side view of the locking disk. Fig. 6 is a fragmentary longitudinal section of said locking means.

Similar characters of reference indicate corresponding parts throughout the several views.

1 indicates the customary yokes which carry the headlights 2 and which are supported by the standards 3 secured to the chassis 4.

The headlights are pivotally supported in their yokes in such a manner that they may be tilted downwardly at a greater or less angle upon approaching another car, to relieve its driver from their blinding glare. In the preferred construction shown in the drawings, each headlight is provided at its outer side with a trunnion 5 journaled in the outer arm of the yoke 1, as shown at the right hand side of Fig. 1, while the headlights are supported at their inner sides upon the opposite ends of a horizontal rock shaft 6 extending across the front of the radiator 7 and journaled in the inner arms of said yokes, the headlights being keyed or otherwise secured to said shaft to turn therewith.

8 indicates an upright shaft arranged beneath the rock shaft 6 and supported in suitable brackets 9 and 10 which may be carried by the adjacent yoke 1 and a member of the chassis, as shown in the drawings. Motion is transmitted from this upright shaft to the horizontal rock shaft 6 by bevel gears 11 and 12, or other suitable means. At its lower end this upright shaft is provided with a worm wheel 13 with which meshes a worm 14 secured to a shaft 15 suitably supported by the chassis and extending rearwardly thereunder. The rear end of this longitudinal shaft is connected by a suitable universal joint 16 with an inclined actuating or rock shaft 17 extending lengthwise of the steering post 18 and supported by a bracket 19 mounted thereon and by a frame-member 20 of the car or other suitable means. This inclined shaft terminates adjacent to the steering wheel 21 where it is provided with a hand-lever 21ª by which it may be conveniently actuated by the driver. If desired, this lever may be provided with a suitable locking catch adapted to engage a toothed segment 22, similar to the locking devices ordinarily employed for the spark and gas controlling levers of the automobile.

The bevel gear 12 may be fixed to the shaft 6, so that by moving the hand lever 21ª in one or the other direction, said shaft is turned accordingly, tilting the headlights to the inclined position indicated by dotted lines in Fig. 2, or returning them to the normal horizontal position indicated by full lines. I prefer, however, to employ the construction shown in the drawings in which the controlling devices of the headlights are combined with a lock for holding the lights firm and steady when in their normal position, and at the same time relieving the shafts 6, 8, 15 and 17 and their connections from the strains to which they might otherwise be subjected. This lock is so constructed that upon swinging the headlights from their tilted to their normal position, they are automatically locked, while upon turning the hand lever 21ª in the proper direction to tilt them, they are unlocked by the initial movement of the lever. For this purpose, a locking disk 23 is secured to the shaft 6 by a key 24 or other suitable means. This disk is provided in its edge with a notch 25 in which the nose of a locking pawl or spring catch 26 is adapted to engage when the headlights are in their normal position. The catch 26 is pivoted by a horizontal pin 27 to the adjacent yoke 1, and in the construction shown, it is yieldingly held in engagement with the locking disk by a spring 28 coiled around said pin and secured at its ends to the hub of the catch and said yoke.

29 indicates a releasing member or disk secured to or integral with the bevel gear 12 which latter is mounted loosely on the shaft 6, as shown in Fig. 6. Projecting from the inner side of the locking disk is a pin 30 which extends into a segmental slot 31 in the releasing disk and serves to couple the two disks together. A suitable spring 32 is preferably interposed between the lower end of this slot and the opposing side of the pin 30 to avoid objectionable looseness of the parts. The releasing disk is provided on the front side of the shaft 6 with a peripheral cam or cam face 33 which is arranged to engage the nose of the catch 26 and trip it out of the notch 25 of the locking disk when the releasing disk is turned in the direction of the arrow shown in Fig. 4. On the rear side of the shaft 6 the releasing disk may be provided with a peripheral stop-shoulder 34 arranged to encounter a coöperating stop or arm 35 carried by the adjacent yoke 1, or other support. These stops are properly located to arrest the rearward or return movement of the releasing disk when the headlights reach their normal position in which the catch 26 interlocks with the locking disk, as shown in Fig. 4.

The locking devices and associated parts may be inclosed by a suitable casing, as shown by dotted lines at 36.

In the normal locked position of the headlights, the coupling pin 30 bears against the upper end of the slot 31 of the releasing disk and the cam 23 is located immediately above the nose of the catch 26. Upon turning the hand lever 21 in the proper direction to tilt the headlights, its initial movement is transmitted only to the releasing disk 29 through the bevel gears 11 and 12. During this movement, the cam 23 forces the locking catch 26 out of engagement with the locking disk, unlocking the headlight shaft 6, and by the continued movement of said lever, the spring 32 is compressed and transmits said movement to the locking disk and the headlight-shaft through the coupling pin 30, thereby tilting the headlights. Upon swinging the lever 21 in the opposite direction to return the headlights to normal position, the releasing disk is turned backwardly and, by the engagement of the upper end of its slot with the coupling pin 30, causes the locking disk and the shaft 6 to turn in the same direction until the catch 26 again interlocks with the notched disk. Vertical vibration of the headlights is thus prevented and the operating shafts and connections are relieved from strains.

By the use of this headlight controlling mechanism, the danger of accidents is largely averted, as an approaching driver not being blinded by the glare of the headlight, can clearly see the other car and pass it at a safe distance.

As the actuating lever of the mechanism is in close proximity to the steering wheel, it can be conveniently manipulated and is always under reliable control of the operator.

I claim as my invention:

1. In an automobile, the combination of the frame, upright supports fixed to the frame, a transverse rock shaft journaled in the upper portions of said supports, a headlight mounted directly on said shaft to turn therewith, said fixed supports rising to the level of the headlight-case, and means accessible from the driver's seat for actuating said shaft.

2. In an automobile, the combination of the frame, upright supports fixed to the frame, a transverse rock shaft journaled in the upper portions of said supports, a headlight mounted directly on said shaft to turn therewith, said fixed supports rising to the level of the headlight-case, an upright shaft, means for transmitting motion from said shaft to said transverse shaft, and means accessible from the driver's seat for operating said upright shaft.

3. In an automobile, the combination of the inclined steering post, a support, a headlight tiltably mounted in said support, an upright shaft, bevel gears for transmitting motion from said shaft to the headlight, said shaft being provided at its lower end with a worm-wheel, a longitudinal shaft extending rearwardly from said upright shaft and provided with a worm meshing with said worm wheel, an inclined shaft extending lengthwise of the steering post and having an actuating device, and means for transmitting motion from said inclined shaft to said longitudinal shaft.

4. In an automobile, the combination of a pair of fixed upright yokes, a transverse rock shaft journaled in the inner arms of said yokes, a pair of headlights secured at their inner sides to the ends of said rock shaft and journaled at their outer sides in the outer arms of said yokes, an actuating device for said sh' accessible from the interior of the automobile, and operative connections extending from said actuating device to said rock shaft.

5. In an automobile, the combination of a shaft, a tiltable headlight secured to said shaft, a locking member fixed to said shaft, a locking device engaging said member, a releasing member coupled to said locking member and rotatable independently thereof to a limited extent, said releasing member having means arranged to disengage said locking device from said locking member, and means for rotating said releasing member.

6. In an automobile, the combination of a shaft, a tiltable head-light secured to said shaft, a notched locking disk fixed to said shaft, a catch arranged to interlock with the notch of said disk, a releasing disk loosely mounted on said shaft and having a cam arranged to disengage said catch from the locking disk, one of said disks having a coupling pin and the other a segmental slot which receives said pin, and means for rotating said releasing disk.

7. In an automobile, the combination of a shaft, a tiltable headlight secured to said shaft, a notched locking disk fixed to said shaft, a catch arranged to engage the notch of said disk, a releasing disk loosely mounted on said shaft and having a cam arranged to trip said catch, one of said disks having a segmental slot and the other a coupling pin arranged in said slot, a spring interposed between said pin and one end of said slot, and means for turning said releasing disk.

MICHAEL J. CAWLEY.